United States Patent
Bryson (10) Patent No.: US 7,652,990 B2
(45) Date of Patent: Jan. 26, 2010

(54) METHOD AND APPARATUS FOR PROVIDING QUALITY OF SERVICE LEVEL IN BROADBAND COMMUNICATIONS SYSTEMS

(75) Inventor: Sidney L. Bryson, Bolingbrook, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 695 days.

(21) Appl. No.: 11/288,537

(22) Filed: Nov. 29, 2005

(65) Prior Publication Data

US 2007/0121501 A1 May 31, 2007

(51) Int. Cl.
H04L 12/28 (2006.01)
(52) U.S. Cl. ...................................... 370/230
(58) Field of Classification Search ................. 370/230, 370/389, 395.21; 709/225, 226, 227, 228, 709/229; 726/3; 713/182
See application file for complete search history.

(56) References Cited

U.S. PATENT DOCUMENTS

| | | | | |
|---|---|---|---|---|
| 6,683,853 B1 * | 1/2004 | Kannas et al. | ............... | 370/237 |
| 6,894,994 B1 * | 5/2005 | Grob et al. | .................. | 370/335 |
| 6,898,635 B2 * | 5/2005 | Jung | ........................... | 709/226 |
| 7,320,029 B2 * | 1/2008 | Rinne et al. | .................. | 709/223 |
| 7,453,851 B2 * | 11/2008 | Westphal et al. | ............ | 370/331 |
| 2003/0123424 A1 | 7/2003 | Jung | | |
| 2004/0228354 A1 | 11/2004 | Anshutz et al. | | |
| 2006/0159044 A1* | 7/2006 | Watanabe et al. | ........... | 370/328 |
| 2006/0215565 A1* | 9/2006 | Borella | ....................... | 370/241 |

FOREIGN PATENT DOCUMENTS

EP 1244265 9/2002

* cited by examiner

*Primary Examiner*—Kwang B Yao
*Assistant Examiner*—Alex Skripnikov
(74) *Attorney, Agent, or Firm*—Duft Bornsen & Fishman LLP (57) ABSTRACT

An access terminal having user applications identified by product keys used to determine a QoS level to be granted to invoked user applications for the establishment of connections by an access network. The access terminal invokes the user applications, identifies the product key of the invoked user applications and determines a quality of service (QoS) level to which the invoked user applications are to be granted. The user applications may be formed into preferred and non-preferred categories with preferred user applications generally having a higher QoS than the non-preferred user applications. Access network connections using a high QoS are established from the preferred user applications to preferred servers of the access network. Connections from the non-preferred user applications are extended, using a lower QoS, by the access network to servers of a public data network.

7 Claims, 7 Drawing Sheets

METHOD AND APPARATUS FOR PROVIDING QUALITY OF SERVICE LEVEL IN BROADBAND COMMUNICATIONS SYSTEMS

FIELD OF THE INVENTION

This invention relates to a method and apparatus for determining the quality of service (QoS) to be granted to user applications for the establishment of connections by a packet based access network of a communication system. The invention further relates to the provision of an access terminal that determines the QoS level to be granted to a user application for the establishment of an access network connection. The access terminal then generates signals requesting the establishment of an access network connection using the determined level of QoS.

PROBLEM

It is known to equip communications system networks, including packet based access networks, with QoS functionality. An access network is a private network that provides services to customers of the access network. The access network may also act as a gateway to a public network, such as the Internet. QoS enables an access network to offer priority service for one or more traffic flows while not causing traffic flows of a lower priority to fail. QoS enables an access network provider to prioritize network traffic by offering high priority service to some users while offering a lesser level of service to other users. A high QoS level may be granted to the traffic of a particular user based on the user's willingness to pay an increased amount for the high QoS level. A lower QoS level may be granted to the traffic of a different user whose communication needs are less demanding and who is willing to accept a lower QoS level in return for a corresponding reduction in costs for traffic deemed by the user to be less urgent.

QoS is advantageous for an access network provider since it permits better control over network resources; it enables the access network provider to offer tailored services to users; and it permits the harmonious coexistence of critical traffic and non-critical traffic. A common expedient used in controlling access network traffic is to drop packets, when necessary, of traffic having a low QoS level. It is also known for an access network provider to control the QoS level of network traffic by managing the bandwidth, jitter, latency and loss characteristics of the access network.

It is known in the prior art to use an access network in a determination of the QoS level to be granted to user applications. The use of the access network for this function is a problem since it requires the access network and an access terminal and to exchange signals to determine the appropriate QoS level. This increases the complexity of the access network.

It is common practice for user applications of an access terminal to be subdivided into functional groups that are based upon characteristics common to the user applications defining a category. An example of such characteristics may be a functional group of user applications that provide VoIP service. The user applications of other functional groups may provide other types of service on a per category basis such as video, data, voice, etc.

It is a problem that prior art QoS systems require that the user applications within a functional group be granted the same QoS level. This is disadvantageous to both the owner of the access terminal and the network provider since it limits flexibility in granting different QoS levels to each user application in the same category. The requirement that the same QoS level be granted to all user applications of a functional group is a problem since it ignores meaningful functional characteristics and requirements that can distinguish the user applications within a functional group. For example, although all user applications of a functional group may be dedicated to providing VoIP service, the operational requirements of the user applications of such a functional group may vary depending upon significant differences in the type of traffic (local, domestic, foreign, etc.) served by each user application. This is a problem since it requires the same QoS level for all user applications of the same functional group. This requirement is undesirable since it is often advantageous for the user applications of a functional group to have the flexibility of being given different levels of QoS.

In view of the above, it can be seen that it would be desirable to provide access terminal users and access network providers with flexibility in determining the appropriate QoS levels to be granted to user applications of the same functional group. This flexibility is not available in prior art QoS systems.

SOLUTION

The above and other problems are solved by the present invention in accordance with which an access terminal may grant different QoS levels to user applications in the same functional group. The QoS levels may be granted on a per user application basis rather than on a per group basis wherein all user applications of a functional group are granted the same QoS level. The grant authority of QoS levels is provided by the access terminal. The removal of the QoS level determination per use flow from the access network reduces its cost and complexity. Instead, the access terminal is granted authority to determine the QoS levels by the access network upon initialization and subsequently controls the user applications on a per flow basis. The ability to grant different levels of QoS to the different user applications of the same functional group is advantageous to the network provider. This permits the network provider to steer network traffic from the different user applications of a group to different servers based on the operational needs of the user of the access terminal. For example, with this increased flexibility in granting QoS levels, the access network provider can steer network traffic from the same user application group to different servers that provide the same service (such as VoIP, Video, Push To Talk) but by different service providers. It is possible that the access network provider may prefer one such service (VOIP, Video, and Push to Talk) over another based upon a perceived difference in quality. In this case, the access network provider may assign different levels of QoS to the user applications of the same group. The user application requesting a connection to the preferred service source could be assigned to a higher level of QoS by the network provider. The user application requesting a connection to the less preferred service source could be assigned a lower level of QoS. Both service sources could be associated with servers of the public data network. Alternatively, it is possible that the preferred service source could be associated with a preferred server of the access network while the nonpreferred service source is associated with a server of the public data network.

Further in accordance with the invention, the access terminal is adapted to store both a product key and a secret key that identify and authorizes the access terminal to the network provider. Product keys are assigned to the user applications for identifying and authenticating the user applications to the access terminal. The secret key of the access terminal together with the product keys of the user applications are used in determining the QoS level to be granted to the user applications.

The access terminal invokes a user application requiring the establishment of an access network connection. A logic element within the access terminal compares the product key of the invoked user application with the secret key of the access terminal to determine whether the invoked application is authorized for service by the access terminal.

In accordance with a first embodiment of the invention, the access terminal determines the QoS level granted to an invoked user application by applying a product key of an invoked user application to control logic within the access terminal. The control logic uses the identified product key to determine the QoS level to be granted to the invoked user application. The access terminal then applies signals specifying the granted QoS level to the access network for the establishment of the required network connection.

In accordance with a second possible embodiment of the invention, the secret key of the access terminal and the product key of an invoked user application are applied to key matching algorithms in the control logic of the access terminal. The key matching algorithms process the received secret key and product key to determine the QoS level to be granted to the invoked user application. Key matching algorithms are well known to those skilled in the art. In accordance with the present invention, keys may be simple indicia, digital signatures, serial numbers, or any indicia that identifies a user application.

In a manner similar to that of the first embodiment, the access terminal is authorized by the access network through the access terminal's product key. The access terminal then applies signals specifying the granted QoS level to the access network for the establishment of the required network connection.

Further in accordance with the invention, the user applications of the access terminal are divided into functional groups with the user applications of a group being adapted to be granted different levels of QoS. This differs from prior art QoS systems that require all user applications within a group be granted the same QoS level. The present invention advantageously permits QoS levels to be granted to user applications based upon the functional and operational characteristics of each user application regardless of whether it is within a group of user applications.

The access terminal of the present invention is adapted to serve user applications granted different levels of QoS such as high, medium and low, as well as intermediate gradations of QoS. Following the authorization and authentication of an invoked user application as well as a determination of the QoS level to be granted, the access terminal transmits signals to the access network specifying the granted level of QoS as well as a server to which an access network connection is to be established. This connection may be established by the access network or may be extended by the access network to a server of a public data network such as the Internet.

Further in accordance with the present invention, user applications may be of different categories such as preferred or non-preferred. User applications may be granted different levels of QoS as determined by their product keys. Generally, user applications in a preferred category have product keys specifying higher levels of QoS than do the product keys of user applications in a non-preferred category. Prior to the time of installation, user applications may be granted a QoS level by the access network provider or may be granted QoS levels determined during negotiations between the access network provider and the user of the access terminal. Some user applications in the non-preferred category may not have a product key. At the discretion of the access network provider, user applications that do not have a product key may receive a default level of service, or may receive no service.

The access terminal of the present invention is adapted to be coupled to an access network having preferred servers. The access terminal is further adapted to be connected via the access network to a public data network having non-preferred servers. The access terminal controls the operation of its preferred and non-preferred user applications in the establishment of connections to the preferred servers of the access network and to the non-preferred servers of the public data network. Advantageously, the preferred user applications request connections to the preferred servers of the access network. Similarly, the non-preferred user applications request connections to the non-preferred servers of the public data network.

Further in accordance with the invention, the access network serves a database which stores information regarding connections established by the access network. The network service provider uses the database to manage the access network and the access terminal. The database also stores data which enables the network provider to control the authentication and authorization functions required to assure the network provider that the access terminal is authorized for service by the access network and to assure the access network provider that the user applications are authorized for service at a QoS level authorized by the network provider.

The access terminal may be any general-purpose computer including, for example, an enhanced cell phone adapted to download specialized user applications. User applications may be loaded into the access terminal by the access network provider at the time of manufacturer or sale of the access terminal. Alternatively, a user can load user applications into the access terminal at any time. A user may obtain user applications from the access network provider or from a third-party. The user applications received from the access network provider will normally be of the preferred category and will be adapted to access preferred servers of the access network. These preferred servers are adapted to provide specialized enhanced services to users of the access terminals. The enhanced services may include specialized ring tones, games, internet service, streaming video, VoIP, etc. Access network connections from invoked user applications to preferred servers of the access network would generally be established using high levels of QoS.

Further in accordance with the invention, a plurality of access terminals may be connected to the access network for the granting of QoS levels to user applications substantially as above described for an access terminal. Some of the plurality of access terminals may be assigned different types of traffic so that some access terminals may specialize in a first type of traffic while other access terminals may serve other types of traffic.

DESCRIPTION OF THE DRAWINGS

The above and other features and advantages of the invention may be better understood from a reading of the following detailed description taken in conjunction with the drawings in which.

DETAILED DESCRIPTION

FIGS. 1-7 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
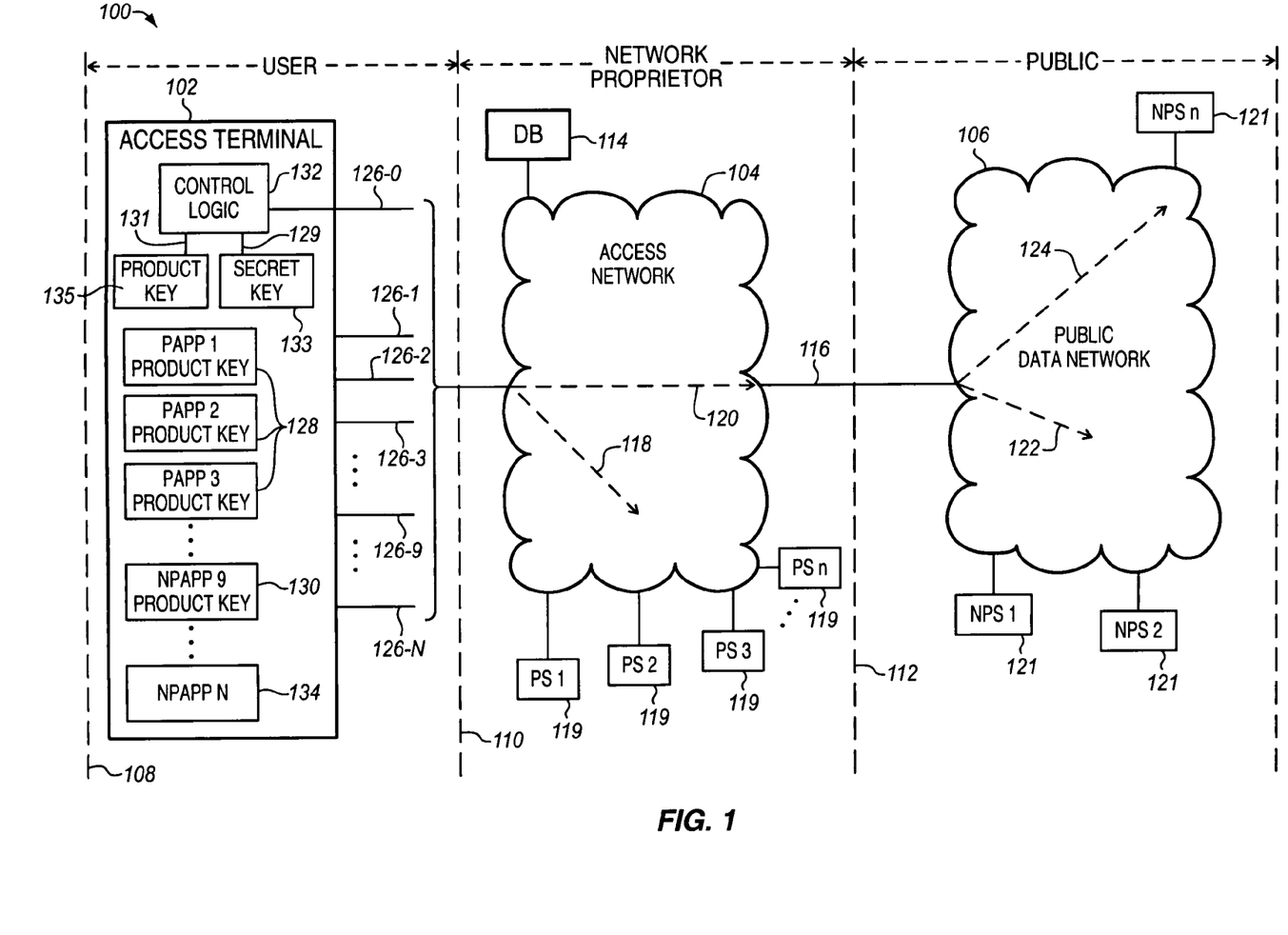
FIG. 1 discloses a possible embodiment of the invention.

Description of FIG. 1

FIG. 1 discloses a possible embodiment of the invention comprising an access terminal 102 adapted to be embodied in a communication system 100 having an access network 104 and a public data network 106. Access terminal 102 contains a plurality of user applications 128, 130 and 134 that, when in use, require the establishment of network connections to servers 119 of access network 104 and/or to servers 121 of public data network 106. Access terminal 102 controls the operation of its user applications 128, 130 and 134 by invoking a user application requiring the establishment of an access network connection and by then determining the appropriate QoS level to be granted to the invoked application. The granted QoS level is transmitted to the access network 104 for the establishment of a connection to a preferred server 119 of access network 102 or to a non-preferred server 121 of public data network 106.

Access terminal 102 contains secret key 133, control logic 132 and user applications 128, 130 and 134. The user applications include preferred user applications 128 (PAPP1, PAPP1 and PAPP3) and non-preferred user applications 130 (NPAPP9) through 134 (NPAPPN). The user applications 128, 130 and 134 may comprise software programs or other applications that may be invoked by the user of access terminal 102 to request the establishment of connections by access network 104 and public data network 106 to preferred servers 119 and nonpreferred servers 121, respectively. Access network 104 and public data network 106 may be packet based networks of the landline or wireless type that establish virtual connections in a manner well known to those skilled in the art. Public data network 106 may be the Internet.

Access network 104 contains appearances of preferred servers 119 (PS1, PS2, PS3, and PSn). Public data network 106 contains appearances of non-preferred servers 121 (NPS1, NPS2 ... NPSn). Access network 104 is operable to establish network connections from preferred user applications 128 of access terminal 102 to preferred servers 119. Access network 104 can also establish connections from nonpreferred user applications 130 and 134 of access terminal 102 to public data network 106 via paths 120 and 116 to non-preferred servers 121. Access network 104 is shown on FIG. 1 between vertical lines 110 and 112. Public data network 106 is positioned to the right of vertical line 112 on FIG. 1. Access network 104 has a database 114. The network provider may use database 114 to determine the level of QoS that user applications 128, 130 and 134 of access terminal 102 may be granted for the establishment of network connections.

The establishment of network connections between user applications 128, 130 and 134 and the preferred servers 119 of access network 104 and the non-preferred servers 121 of public data network 106 permits the user applications 128, 130 and 134 and servers 119, 121 to communicate. Servers 119, 121 can perform enhanced functions required by the user applications 128, 130 and 134. Such enhanced functions require different levels of QoS in packet networks and may include specialized ring tones, screens savers, games, Internet service, streaming audio, streaming video, VoIP, etc.

Access terminal 102 may be a cell phone or any general-purpose computer having a plurality of user applications that may be invoked to request the establishment of network connections. In general, the preferred user applications 128 are granted a high level of QoS for the establishment of connections to preferred servers 119 of access network 104. Non-preferred user applications 130 and 134 are normally granted a lower level of QoS for the establishment of connections to the non-preferred servers 121 of public data network 106. Further details regarding the distinctions between the preferred user applications and the non-preferred applications are subsequently described.

Access terminal 102 may contain control logic 132, product key 135, and secret key 133. Preferred user applications 128 and non-preferred user application 130 contain a product key. Non-preferred user application 134 does not contain a product key. The function of a product key is to assist control logic 132 in determining the QoS level to be granted to an invoked user application for the establishment of an access network connection. A further function of control logic 132 is to identify a user application requesting service as well as to determine whether the requesting user application is authorized for service in access terminal 102.

Element 133 stores a secret key that identifies access terminal 102 to the network provider and authorizes access terminal 102 to control QoS signals to the access network 104. Control logic 132 may contain memory and logic (not shown) that enable access terminal 102 to control the operation of the user applications as well as to determine the QoS level granted to an invoked user application. Secret key 133 has a number of functions. First, secret key 133 assists the network provider in managing access network 104 and access terminals 102. Access terminal 102 is owned by the user of the access terminal 102, but is installed in communications system 100 with the guidance and cooperation of the network provider.

Access terminal 102 does not initially contain a secret key. After access terminal 102 is ready for initialization, access terminal 102 transmits a product key 135 identifying access terminal 102 to database 114 for use by the network provider. The product key 135 of access terminal 102 requests the assignment of a secret key 133 by database 114 to access terminal 102. The network provider accesses database 114 to transmit a secret key 133 to access terminal 102. Access terminal 102 stores secret key 133. The identity of secret key 133 is known only to the network provider and is not known to the user of access terminal 102. The storage of secret key 133 signifies that access terminal 102 is authorized for service in communications system 100.

Another function of secret key 133 is to assist access terminal 102 in determining the QoS level to which each invoked user application may be granted. Secret key 133 also authenticates each invoked user application requiring service. In order to maintain security for the secret key of an access terminal 102, the network provider may periodically transmit a new secret key over path 126-0 to access terminal 102.

User applications 128, 130 and 134 are generally loaded into the access terminal 102 by the owner of access terminal 102. This may be done at any time by the owner of access terminal 102 independently of the network provider. However, the network provider is involved in a determination of the QoS level that may be granted to each user application. Different user applications 128, 130 and 134 may be granted different levels of QoS with the preferred user applications 128 generally receiving a higher level of QoS than the non-preferred user applications 130 and 134.

Preferred user applications 128 have high level of QoS and receive a high level of service within an access network 104. Non-preferred user applications 130 may be granted a lower level of QoS and will therefore generally receive a lower level of service in the establishment of access network connections. User application 134 does not have a product key. With the concurrence of the network provider, user application 134 may be served on a low level of QoS by access network 104. Alternatively, it may be denied service by the network provider.

Database 114 stores information required by the network provider to administer access network 104 and access terminal 102. Database 114 may also provide an accounting function that records the duration of established network connections as well as the QoS level provided for each connection. This accounting function is useful to the network provider since it identifies network connections that are established at a lower QoS level than that required to an invoked user application by access terminal 102. This is useful when network traffic is high so that a requested network connection can be established, but only at a lower QgS level than that granted to the invoked user application.

Figure 2:
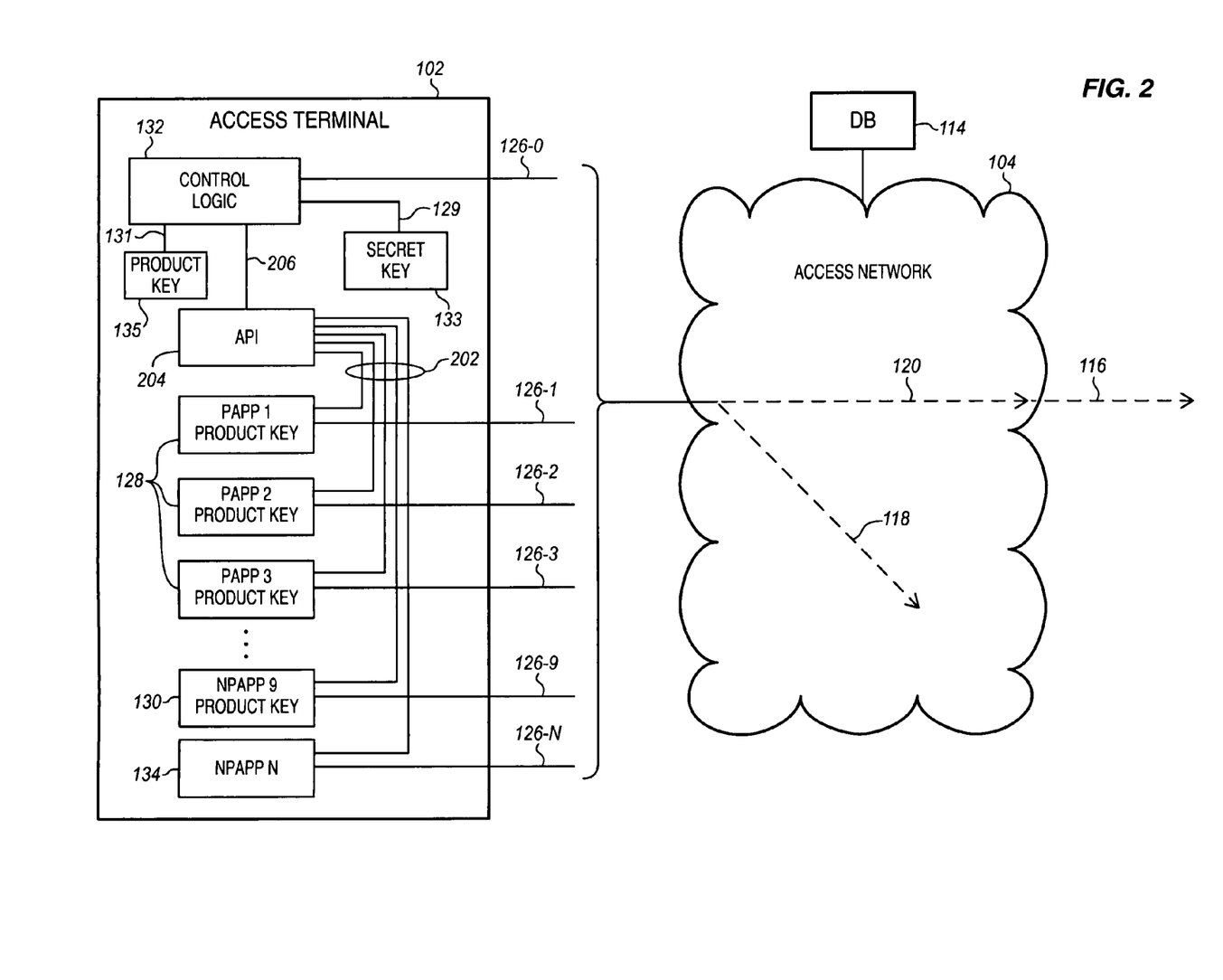
FIG. 2 discloses further details of the embodiment of FIG. 1.

Description of FIG. 2

FIG. 2 discloses further details of the access terminal 102. Access terminal 102 of FIG. 2 contains an application program interface 204 (API) which enables the user applications 128, 130 and 134 to communicate with control logic 132. Application program interface 204 is well-known in the art and comprises a set of routines, protocols and tools comprising program building blocks that enable programmers to write applications consistent with the requirements of control logic 132 while precluding the programmers from writing programs that could adversely impact the operation of control logic 132.

Access terminal 102 grants an appropriate QoS level to an invoked user application requiring the establishment of a network connection. This process begins when the invoked user application transmits information over conductor 202 to the application program interface 204 and via path 206 to control logic 132. The transmitted information includes the product key of the invoked user application.

In accordance with a first embodiment of the invention, control logic 132 uses the received product key to determine the QoS level to be granted to an invoked user application. The granted QoS level is transmitted by control logic 132 over paths 126-0 and 120 to access network 104. Access network 104 transmits the received QoS level to database 114 which uses the received QoS level to manage the establishment of the connection requested by the invoked in user application. Database 114 maintains records of each connection established by access network 104 as well as the QoS level provided by the network in serving the connection. The network path over which the connection is established includes path 118 shown on FIG. 2. The preferred servers 119 are not shown on FIG. 2 to minimize drawing complexity. Similarly, public data network 106 and non-preferred servers 121 of FIG. 1 are not shown on FIG. 2 to minimize drawing complexity.

In accordance with a second embodiment of the invention, access terminal 102 uses both secret key 133 as well as the product key identifying the invoked user application in determining the QoS level to be granted. Access terminal 102 determines the QoS level to be granted by using the product key of the invoked user application and the secret key 133. The product key is applied over path 202 and extended through application program interface 204 and over path 206 to control logic 132. Control logic 132 applies the secret key 133 and the received product key to key matching algorithms within control logic 132. The key matching algorithms process the received information and derive the QoS level that is to be granted to the invoked user application. As in the first embodiment, the granted QoS level is transmitted over path 126-0 to access network 104. Access network 104 also receives indicia specifying the preferred server 119 or the non-preferred server 121 to which the network connection is to be established.

Secret key 133 is used as described in the second embodiment for determining the QoS level to be granted to an invoked user application. Secret key 133 is also used in both embodiments to determine whether an invoked user application 128, 130 and 134 is authorized for service within access terminal 102. Control logic 132 uses the product key as well as the secret key 133 to determine whether the invoked user application is authorized for service. If the requested user application is not authorized, it may either be denied service or may be served on a when available basis at the option of the network provider. Non-preferred user application 134 does not have a product key. In accordance with agreements between the network provider and the user of access terminal 102, non preferred user application 134 may be either be denied service by the network provider or may be provided service on a when available basis.

As mentioned, secret key 133 is transmitted by the network provider from database 114 to access terminal 102 over path 126-0. The secret key is not known or accessible to the end user or the user applications of the access terminal and is stored securely in secret key element 133. Prior to the initialization of access terminal 102 and the installation of the user applications, the network provider and the user of access terminal 102 negotiate and jointly determine the QoS level that may be subsequently granted to invoked one of user applications 128, 130 and 134. The legitimate use of the QoS levels is of significance to the network provider who desires that access network 104 be used to provide high level QoS only for user applications that are charged tariffs appropriate to the higher QoS levels. In order to maintain security for the secret key of an access terminal 102, the network provider may periodically transmit a new secret key over path 126-0 to access terminal 102.

Figure 3:
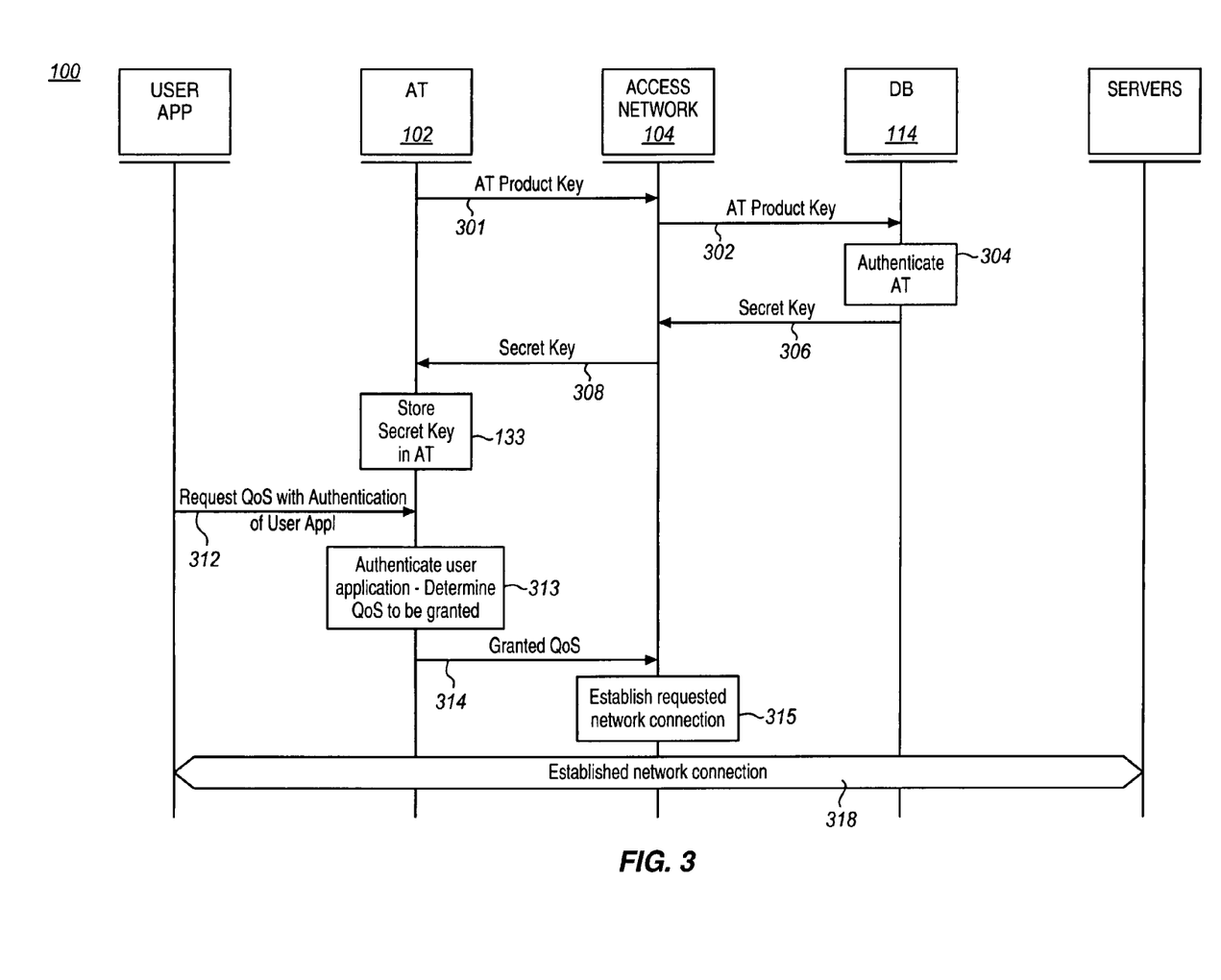
FIG. 3 discloses further details of the embodiment of FIGS. 1 and 2.

Description of FIG. 3

FIG. 3 discloses the signals transmitted between the elements of communication system 100 for the initialization of access terminal 102 as well as for the establishment of access network 104 connections requested by invoked user applications 128, 130 and 134. The process of initializing access terminal 102 begins with the transmission of the product key 135 of access terminal 102 over message 301 on FIG. 3 to access network 104. Access network 104 extends the access terminal product key 135 via message 302 to database 114. The product key 135 of access terminal 102 is known to the network provider who has priorly stored the product key 135 in database 114. The product key 135 of access terminal 102 is stored in database 114 to enable the network provider to authenticate access terminal 102 and approve it for service in communication system 100.

The product key 135 of access terminal 102 is authenticated by element 304 which is a part of database 114. In response to the authentication, element 304 transmits a secret key over message 306 to access network 104. Access network 104 extends the secret key over message 308 to access terminal 102 for storage by secret key element 133. The storage of the secret key 133 completes the initialization of access terminal 102 and signifies that access terminal 102 is authorized to serve requests from invoked ones of user applications 128, 130 and 134. The functions performed by access terminal 102 in serving user applications 128, 130 and 134 include the authentication of the user applications 128, 130 and 134 and the granting of the appropriate QoS level to each invoked user application 128 and 130 requiring a connection by access network 104.

An invoked one of user application 128, 130 and 134 requiring the establishment of a connection by access network 104, requests authentication and the granting of a QoS level by the transmitting a signal over path 312 to access terminal 102. Access terminal 102 receives the product key of the invoked one of user application 128 and 130. Element 313 of access terminal 102 determines that the invoked user application is authorized for service and grants an appropriate QoS level to the invoked user application. Element 313 transmits over path 314 the granted QoS level as well as indicia identifying the preferred server 119 or non-preferred server 121 to which a network connection is to be established. Access network 104 receives the transmitted information from path 314. Element 315 of access network 104 then establishes the requested connection to the specified server.

Figure 4:
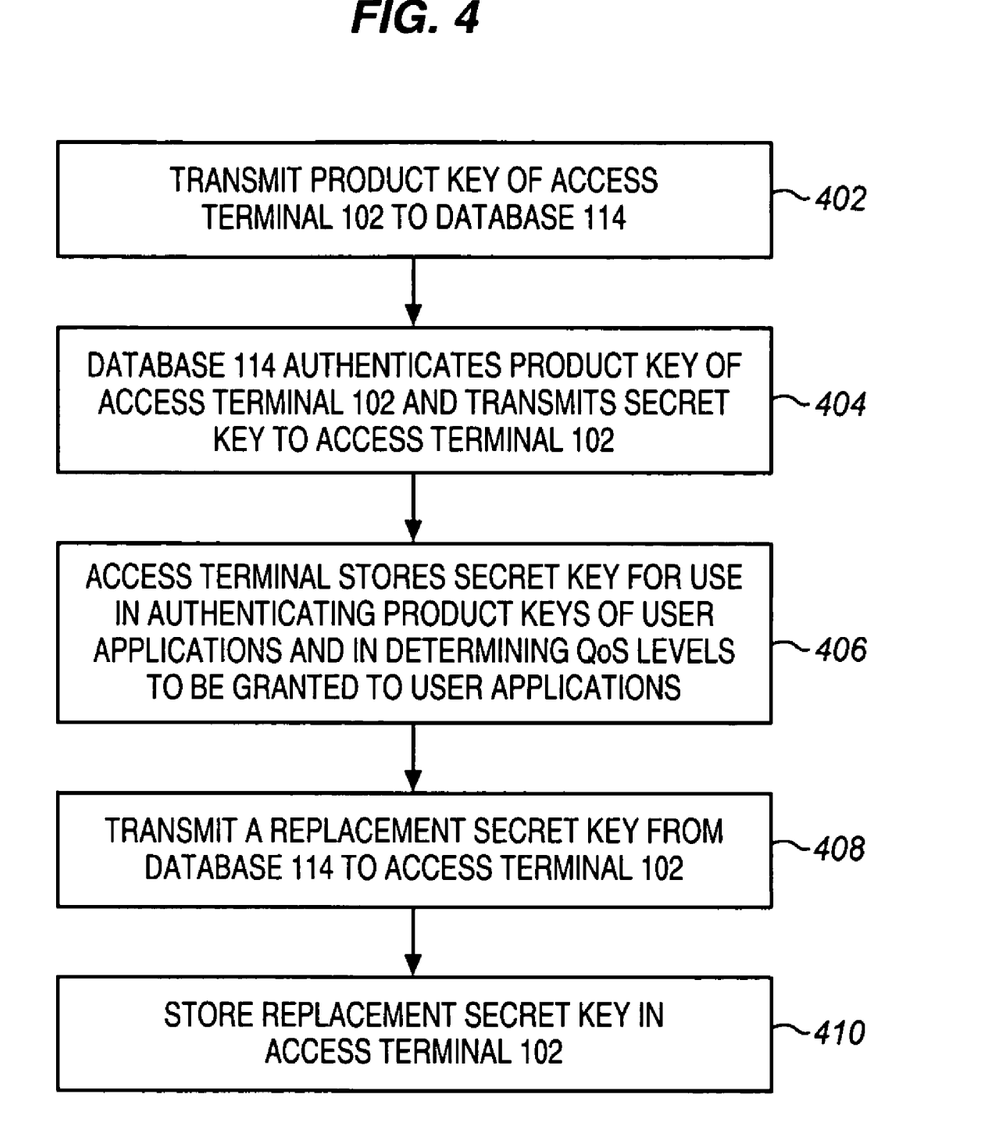
FIGS. 4, 5, 6 and 7 are flow charts illustrating the operation of the systems of FIGS. 1 and 2.

Description of FIG. 4

FIG. 4 is a flow chart illustrating the process steps used by the apparatus of the present invention in initializing access terminal 102. The purpose of the initialization is to enable the network provider of access network 104 to identify access terminal 102 by the receipt of a product key identifying access terminal 102 and to transmit a secret key 133 from database 114 to access terminal 102. The identity of secret key 133 is known only to the network provider. Secret key 133 is used to authenticate the user applications 128, 130 and 134. Secret key 133 is also used to determine the QoS level to be granted to each invoked user application The process of FIG. 4 begins in step 402 when the product key 135 of access terminal 102 is transmitted to database 114 during system initialization. In step 404, database 114 authenticates the received product key 135 of access terminal 102. Database 114 transmits a secret key to access terminal 102 in step 404. In step 406, access terminal 102 stores the secret key for subsequent use in authenticating the product keys of invoked user application 128, 130 and 134 as well as for determining the QoS levels to be granted to invoked user applications requiring the establishment of a network connection.

Step 408 may subsequently transmit a replacement secret key from database 114 to access terminal 102. The replacement secret key is transmitted by the network provider in the event that the identity of the original secret key has been compromised. Step 410 stores the replacement secret key in access terminal 102 and discards the earlier secret key. Steps 408 and 410 may be iteratively performed Description of FIG. 5

Figure 5:
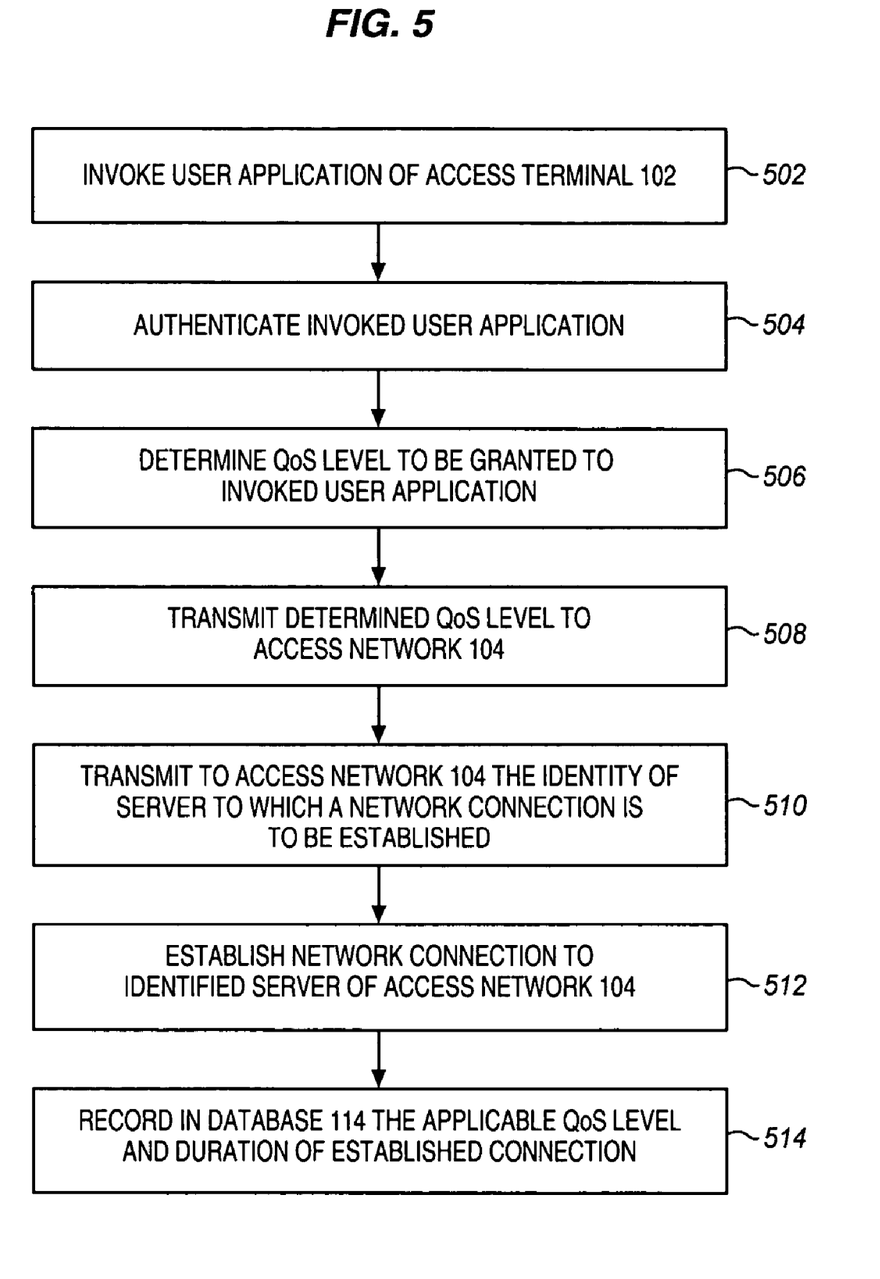

FIG. 5 is a flow chart illustrating the process steps used by the systems of FIGS. 1 and 2 in establishing network connections required by an invoked one of user application 128, 130 and 134. Step 502 invokes a user application. Step 504 authenticates the invoked user application to determine whether it is authorized for service within access terminal 102. Step 506 uses the product key of the invoked user application to determine the QoS level that may be granted to the invoked user application. Step 508 transmits the granted QoS level to access network 104 for use in establishing the access network connection. Step 510 transmits to access network 104 the identity of the preferred server 119 to which the access network connection is to be established. Step 512 establishes the access network connection to the identified preferred server 119. Step 514 records in database 114 the applicable QoS level, duration, and other attributes of each connection established by access network 104.

Figure 6:
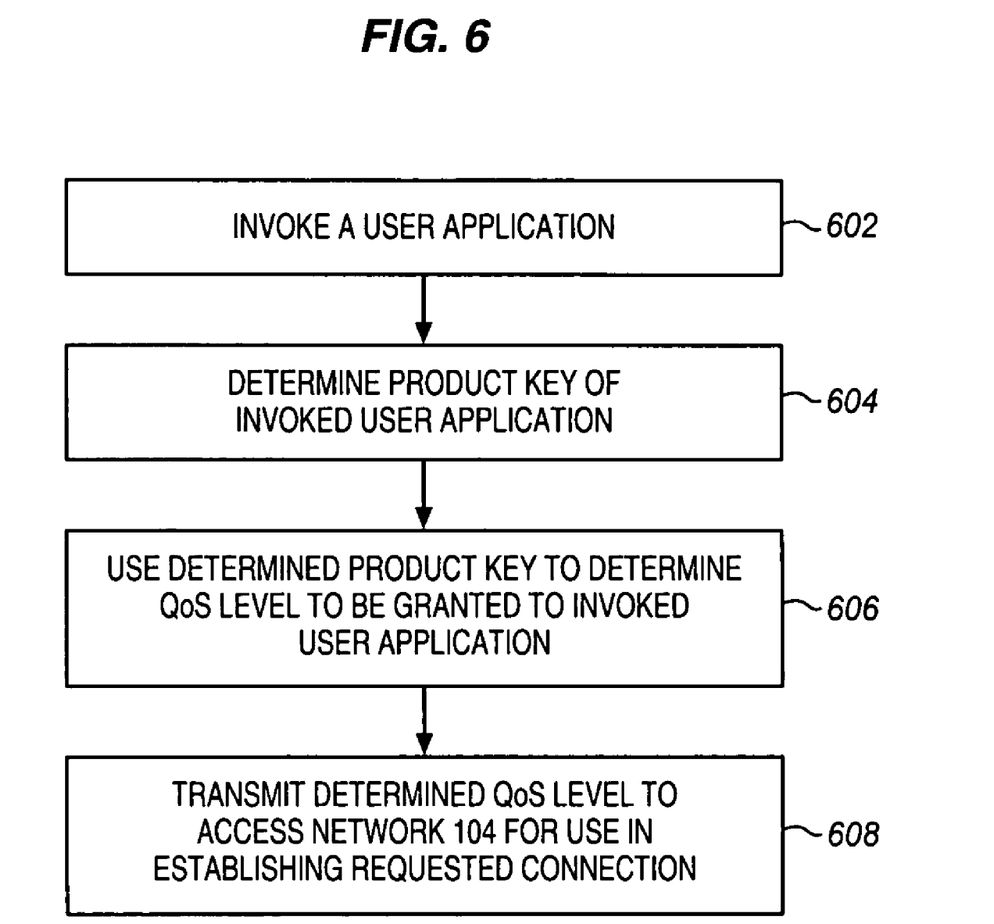

Description of FIG. 6

FIG. 6 is a flow chart illustrating the process steps used by the systems of FIGS. 1 and 2 in determining the QoS level to be granted to a user application requiring the establishment of a network connection. The process begins in step 602 which invokes a user application requiring the establishment of a network connection. Step 604 determines the product key of the invoked user application. In step 606, the product key of the invoked user application is compared to the secret key 133 and used to determine the QoS level to be granted to the invoked user application. In step 608, the granted QoS level it is transmitted to access network 104 over path 126-0.

Figure 7:
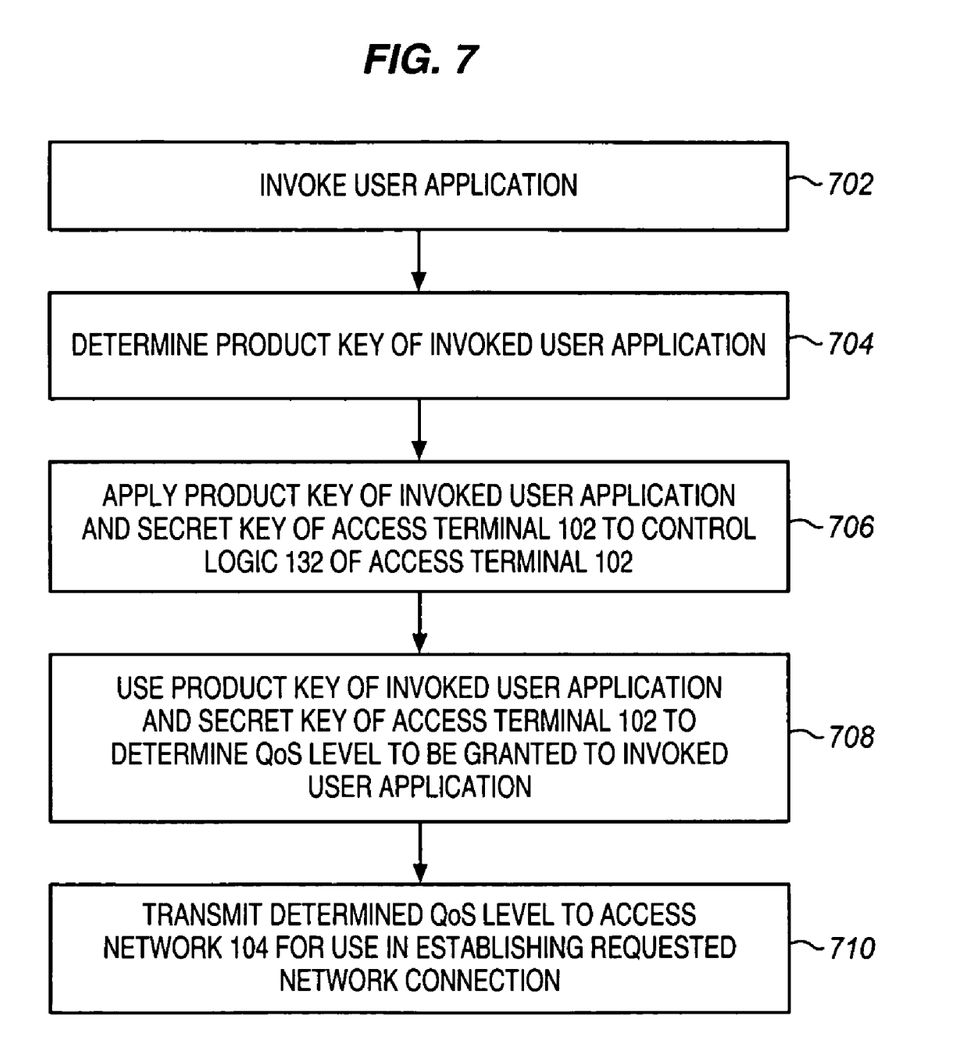

Description of FIG. 7

FIG. 7 is a flow chart illustrating the process steps used by the systems of FIGS. 1 and 2 to determine the QoS level granted to invoked user application 128, 130 and 134 requiring the establishment of a network connection. The process of FIG. 7 uses both the product key of the invoked user application and secret key 133 to determine the QoS level to be granted. Step 702 invokes a user application requiring a network connection. Step 704 determines the product key of the invoked user application. Step 706 applies the product key and secret key 133 to control logic 132. Step 708 uses the product key of the invoked one of user applications 128, 130 and 134 and secret key 133 to determine the QoS level granted to the invoked one of the user application 128, 130 and 134. The applicable QoS level is determined by applying secret key 133 and the received product key to control logic 132. Step 710 transmits the granted QoS level to access network 104 over path 126-0.

The requested connection may involve the establishment of a connection to a preferred server 119 of access network 104. This path is designated on FIGS. 1 and 2 as element 118. Alternatively, the connection may require the establishment of a connection over path 120 in access network 104 and further over path 160 to a nonpreferred server 121 in public data network 106. Following the establishment of a connection to a requested server, the invoked user application may communicate with the server.

Preferred servers 119 and non preferred servers 121 may be of different types and may provide different services to user applications 128, 130 and 134. For example, some servers may be self-contained in that they generate the signals that are transmitted to user applications 128, 130 and 134. Such a server may generate ringing tones or store games. Both ringing tones and games may be generated by the servers for transmission to user applications 128, 130 and 134. Servers 119 and 121 may also be the end points for signals transmitted by user applications 128, 130 and 134. Other servers may not be the originator of the destination of signals exchanged with the user applications. VoIP is one such example. Some servers may be relatively simple, such as those that generate ringing tones. Other servers may be more complex and perform functions such as the provision of VoIP or streaming video or audio received by the server from an external source.

As priorly mentioned, the present invention is not limited to the use of a single access terminal 102. A single access terminal 102 is shown on FIGS. 1 and 2 to minimize drawing complexity. If desired, a plurality of access terminals may be used. In accordance with the present invention, a plurality of access terminals could be coupled to access network 104 for the control of user applications as above described. The plurality of access terminals could be adapted to serve different types of traffic.

I claim:

1. A method of operating an access network adapted to receive requests for the establishment of connections from invoked user applications of an access terminal to servers of said access network, invoking one of said user applications, identifying a product key of said one invoked user application, wherein said invoked user application is a preferred category or a non-preferred category, and wherein said user applications are adapted to request establishment of access network connections at specified QoS levels, said access network contains preferred and non-preferred servers, said method comprises the steps of:
   verifying said access terminal using a secret key not known to a user of said access terminal;
   said secret key is received by said access terminal from said access network and stored in said access terminal;
   protecting said access terminal with said secret key to prevent the serving of unauthorized user applications of said access terminal;
   receiving a message from said access terminal requesting the use of a QoS level for the establishment of a connection by said access network from said access terminal;
   determining the QoS level to be granted to an invoked user application based upon said product key and said stored secret key;
   granting the use of a determined QoS level for the establishment of said connection;
   receiving indicia characterizing a server to which said access network connection is to be established;
   establishing said access network connection using said granted QoS level when permitted by the present level of access network traffic; and
   establishing said access network connection at a lower QoS level if the present level of network traffic cannot accommodate said requested QoS level.

2. The method of claim 1 wherein said user applications define a plurality of functional groups and wherein at least one QoS level is granted to invoke user applications within a functional group.

3. The method of claim 1 wherein said access terminal comprises logic coupled to an application programming interface, said method comprises the further steps of:
   operating said logic and said programming interface to process information generated by invoked user applications; and
   determining the QoS level to be granted to invoke said user applications.

4. A method of operating an access network adapted to receive requests for the establishment of connections from invoked user applications of an access terminal to servers of said access network, invoking one of said user applications, identifying a product key of said one invoked user application, wherein said invoked user application is a preferred category or a non-preferred category, and wherein said user applications are adapted to request establishment of access network connections at specified QoS levels, said access network contains preferred and non-preferred servers, said method comprises the steps of:
   verifying said access terminal using a secret key not known to a user of said access terminal;
   said secret key is received by said access terminal from said access network and stored in said access terminal;
   protecting said access terminal with said secret key to prevent the serving of unauthorized user applications of said access terminal;
   receiving a message from said access terminal requesting the use of a QoS level for the establishment of a connection by said access network from said access terminal;
   determining the QoS level to be granted to an invoked user application based upon said product key and said stored secret key;
   granting the use of a determined QoS level for the establishment of said connection;
   receiving indicia characterizing a server to which said access network connection is to be established;
   establishing said access network connection using said granted QoS level when permitted by the present level of access network traffic;
   establishing said access network connection at a lower QoS level if the present level of network traffic cannot accommodate said requested QoS level;
   wherein said access terminal is initialized by the steps of:
   transmitting a product key of said access terminal to a database external to said access network;
   transmitting a secret key from said database to said access terminal;
   applying said secret key of said access terminal and said product key of an invoked user application to key-matching algorithms in logic of said access terminal to determine whether said invoked user application is authorized for service by said access terminal; and
   using said key matching algorithms to determine the QoS level to be granted to an authorized one of said invoked user applications for the establishment of a requested connection from said access terminal by said access network.

5. The method of claim 4 including the steps of:
   transmitting a new secret key from said database to said access terminal; and
   operating said key matching algorithms in response to the reception of said new secret key to determine whether said invoked user applications are authorized for service by said access terminal.

6. An access terminal having user applications identified by product keys, said access terminal comprising:
   apparatus that invokes at least one of said user applications;
   apparatus that identifies a product key of said one invoked user application;
   apparatus adapted to store a secret key identifying said access terminal wherein said secret is not known to a user of said access terminal; said secret key protects said access terminal from serving unauthorized user applications;
   apparatus that determines the QoS level to be granted to said one invoked user application based upon said product key and said stored secret key;
   apparatus that generates indicia characterizing a destination defining a server to which a connection is to be established by an access network from said one invoked user application; and
   apparatus that transmits said determined QoS level and said indicia from said one invoked user application to said access network for the establishment of said connection by said access network.

7. The access terminal of claim 6 wherein said user applications define a preferred category having a high QoS level and also define a non-preferred category having a lower QoS level, wherein said user applications define a plurality of QoS functional groups, wherein at least one QoS level is granted at a low level to user applications of a functional group, and wherein said at least one invoked user application is granted a high QoS level by said access terminal.

* * * * *

UNITED STATES PATENT AND TRADEMARK OFFICE
CERTIFICATE OF CORRECTION

PATENT NO.        : 7,652,990 B2
APPLICATION NO.   : 11/288537
DATED             : January 26, 2010
INVENTOR(S)       : Sidney L. Bryson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1093 days.

Signed and Sealed this

Twenty-third Day of November, 2010

David J. Kappos
*Director of the United States Patent and Trademark Office*